US008970385B1

(12) United States Patent
Brooking et al.

(10) Patent No.: US 8,970,385 B1
(45) Date of Patent: Mar. 3, 2015

(54) MOISTURE-DETECTION APPARATUS AND METHOD

(75) Inventors: Michael J. Brooking, Dong Guan (CN); Christopher W. Barney, Sandy, UT (US)

(73) Assignee: Gizmode, LLC, St. George, UT (US)

( * ) Notice: Subject to any disclaimer, the term of this patent is extended or adjusted under 35 U.S.C. 154(b) by 78 days.

(21) Appl. No.: 13/461,544

(22) Filed: May 1, 2012

(51) Int. Cl.
*G08B 21/08* (2006.01)

(52) U.S. Cl.
USPC .......................... 340/604; 340/603; 340/605

(58) Field of Classification Search
CPC ........ G08B 21/08; G08B 21/20; G01M 3/045
See application file for complete search history.

(56) References Cited

U.S. PATENT DOCUMENTS

| | | | | |
|---|---|---|---|---|
| 4,264,902 | A * | 4/1981 | Miller | 340/604 |
| D261,243 | S | 10/1981 | Mintz | |
| 4,297,686 | A * | 10/1981 | Tom | 340/604 |
| D261,998 | S | 11/1981 | Munz | |
| 5,091,715 | A * | 2/1992 | Murphy | 340/604 |
| 5,272,467 | A * | 12/1993 | Krauleidies | 340/604 |
| 6,239,435 | B1 * | 5/2001 | Castleman | 250/339.15 |
| D476,586 | S | 7/2003 | Nash | |
| 6,690,281 | B2 * | 2/2004 | Palmer | 340/604 |
| 6,873,263 | B1 * | 3/2005 | Hohman | 340/602 |
| 6,972,395 | B2 | 12/2005 | Jones | |
| 7,466,558 | B2 * | 12/2008 | Yasuda | 361/755 |
| D618,567 | S | 6/2010 | Brooking | |
| D619,023 | S | 7/2010 | Brooking | |
| 8,508,373 | B2 * | 8/2013 | Rice | 340/605 |
| 2002/0000813 | A1 * | 1/2002 | Hirono et al. | 324/690 |
| 2008/0041792 | A1 * | 2/2008 | Crnkovich et al. | 210/739 |

OTHER PUBLICATIONS

The Water Alarm, http://www.thewateralarm.com, pp. 1-2, accessed Mar. 2, 2010.
Water Alarm, http://www.amazon.com/Water-Alarm-Detects-Leaks-Saves/dp/B000JOK11K, pp. 1-5, accessed Mar. 2, 2010.
General Tools WA500 Water Leak Alarm, http://www.amazon.com/General-Tools-WA500-Water-Alarm/dp/B001CEIFNW/ref=pd_sbs_k_4, pp. 1-5, accessed Mar. 2, 2010.

* cited by examiner

*Primary Examiner* — Toan N Pham
*Assistant Examiner* — Rajsheed Black-Childress
(74) *Attorney, Agent, or Firm* — Warren M. Pate; Pate Peterson, PLLC (57) ABSTRACT

A water alarm is disclosed. The water alarm may include a housing, circuit board, power source, sound generator, and a plurality of conductors. The housing may define an interior and an exterior and comprise a bottom portion and a top portion. The circuit board may be contained within the interior of the housing. The power source may be electrically connected to deliver electrical power to the circuit board. The sound generator and plurality of conductors may be electrically connected to the circuit board. Each conductor of the plurality of conductors may be electrically conductive. Each may also be and insert molded within the bottom portion to extend from the interior to the exterior.

10 Claims, 9 Drawing Sheets

MOISTURE-DETECTION APPARATUS AND METHOD

BACKGROUND

1. The Field of the Invention

This invention relates to water detection devices and, more particularly, to novel systems and methods for manufacturing water alarms comprising a housing and one or more conductors extending through a wall of the housing.

2. The Background Art

The average cost of water-damage events continues to increase each year. The cost of repair and restoration from water damage is only part of the equation. Other costs include displacement costs as well as emotional costs arising from the associated frustration, stress, and the like. Water alarms have been produced to alert users early when a leak occurs, thereby limiting the resulting damage. However, current water alarms are not particularly robust and may be damaged by water, misuse, and the like. Accordingly, what is needed is a robust water alarm capable of withstanding the environmental hazards and stresses associated with everyday and long term use.

BRIEF SUMMARY OF THE INVENTION

In view of the foregoing, in accordance with the invention as embodied and broadly described herein, a method and apparatus are disclosed in one embodiment of the present invention as including a water alarm for alerting a user to the presence of water. In selected embodiments, a water alarm in accordance with the present invention may include a housing. A housing may form an enclosure defining or separating an interior and an exterior. Various components of a water alarm may be contained within a housing. For example, one or more circuits, circuit boards, power sources (e.g., batteries), alarm generators (e.g., sound generators, light generators), or the like or combinations or sub-combinations thereof may be contained or partially contained within a housing.

In selected embodiments, one or more conductors may extend from an interior of a housing to an exterior of the housing. Certain components of a water alarm may monitor electrical resistance between the one or more conductors. Such components may trigger an alarm (e.g., activate a sound generator) whenever certain changes in the electrical resistance between two or more conductors is detected.

Conductors in accordance with the present invention may be secured within a housing in any suitable manner. In selected embodiments, an engagement between one or more conductors and a corresponding housing may be created by insert molding the one or more conductors within the housing. Regardless of the shape of a conductor, in an insert molding process, molten material may flow around the conductor and form an intimate contact therewith. For example, conductors may comprise cylindrical pins or dowels formed of a metal or metal alloy. Accordingly, in an insert molding process, molten material may flow around and engage the pins, sealing an interface therebetween against the intrusion of water or the like and holding the pins firmly in place.

In selected embodiments, a conductor in accordance with the present invention may include a lock. A lock may comprise one or more extensions, one or more indentations, or the like or some combination thereof. Such features may provide additional surfaces or edges that may be engaged by molten material in a manufacturing process and increase the ability of material, once hardened, to resist thrust forces urging relative motion between a conductor and a housing. Accordingly, a lock may assist in preserving a seal between a conductor and a housing and in preventing forces applied on an external portion of a conductor from being passed through a wall of a housing to be resolved internally (e.g., by a circuit board or the like that could be damaged thereby).

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF SELECTED EMBODIMENTS

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIGS. 1-7, a water alarm 10 in accordance with the present invention may provide a user (e.g., home owner) with a warning that water, moisture, or the like is present. By positioning one or more alarms 10 near key pipe junctions, floor drains, bath tubs, toilets, water heaters, washing machines, dishwashers, ice makers, water collection points, or the like, a user may be alerted early so that preventative or corrective action may be promptly taken.

In selected embodiments, an alarm 10 may detect even very small amounts of moisture. Moreover, an alarm 10 may detect the presence of water on a variety of surfaces. For example, an alarm 10 may detect water or moisture on surfaces comprising concrete, hardwood, carpet, tile, marble, slate, or the like. Accordingly, a user may be altered to the problem before mold, mildew and serious water damage or flooding can occur.

A water alarm 10 in accordance with the present invention may include a housing 12. A housing 12 may form an enclosure defining or separating an interior and an exterior. In selected embodiments, a housing 12 may comprise multiple components or portions. For example, a housing 12 may comprise a top portion 14 and a bottom portion 16. The multiple portions 14, 16 forming a housing 12 may selectively connect to form the enclosure.

Various components of a water alarm 10 may be contained within a housing 12. For example, one or more circuits, circuit boards, power sources (e.g., batteries), alarm generators (e.g., sound generators, light generators, or combinations thereof) or the like or combinations or sub-combinations thereof may be contained or partially contained within a housing 12. A housing 12 may protect such components from the surrounding environment (e.g., dust, water), unwanted intrusion, or the like.

In selected embodiments, a housing 12 may include one or more apertures 18 enabling an alarm generator, a portion of an alarm generator, sound waves or light generated by an alarm generator, or the like to extend through or exit a housing 12. For example, in selected embodiments, a top portion 14 of a housing 16 may include an aperture 18 (e.g., a centrally located aperture 18) extending therethrough. An outlet portion 20 of a sound generator may extend through or occupy the aperture 18. Accordingly, sound waves exiting a sound generator through an outlet portion 20 thereof may be unobstructed by a housing 12.

A housing 12 may be formed of any suitable material or combination of materials. Similarly, a housing 12 may be formed using any suitable method. In selected embodiments, a housing 12 (e.g., a top portion 14 and bottom portion 16 of a housing 12) may be formed of a polymeric material in a molding process.

Figure 1:
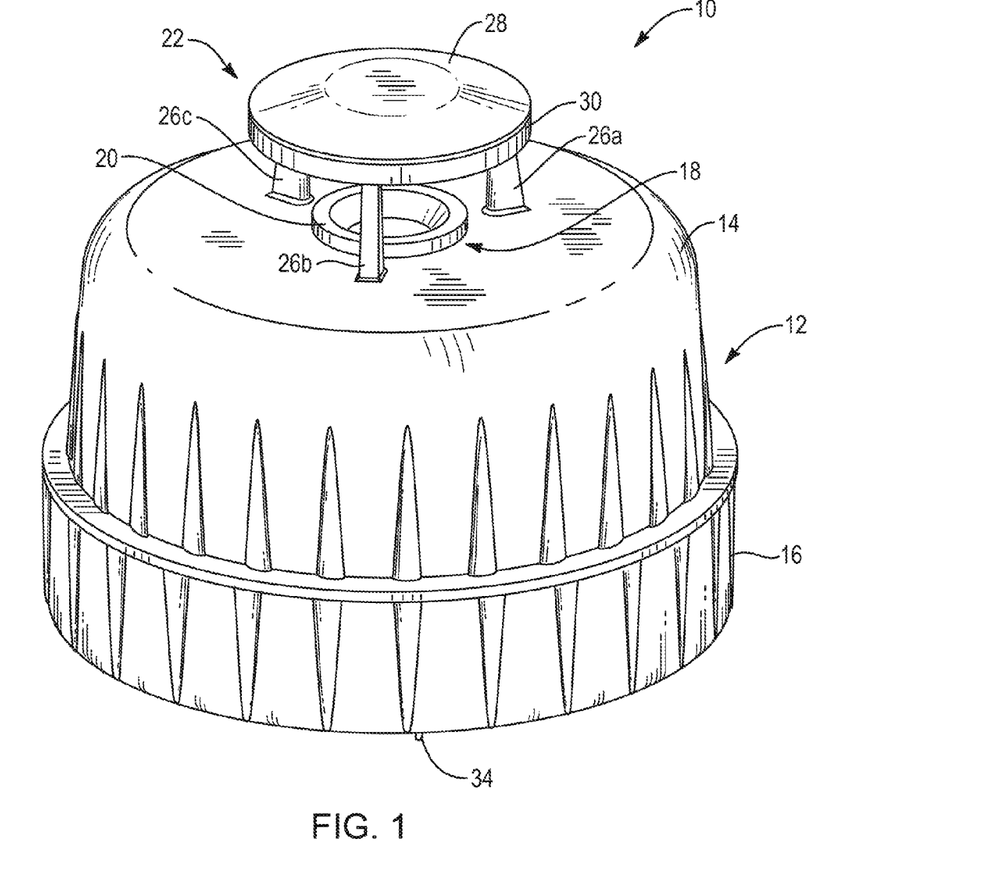
FIG. 1 is a perspective view of one embodiment of a water alarm in accordance with the present invention.
Figure 2:
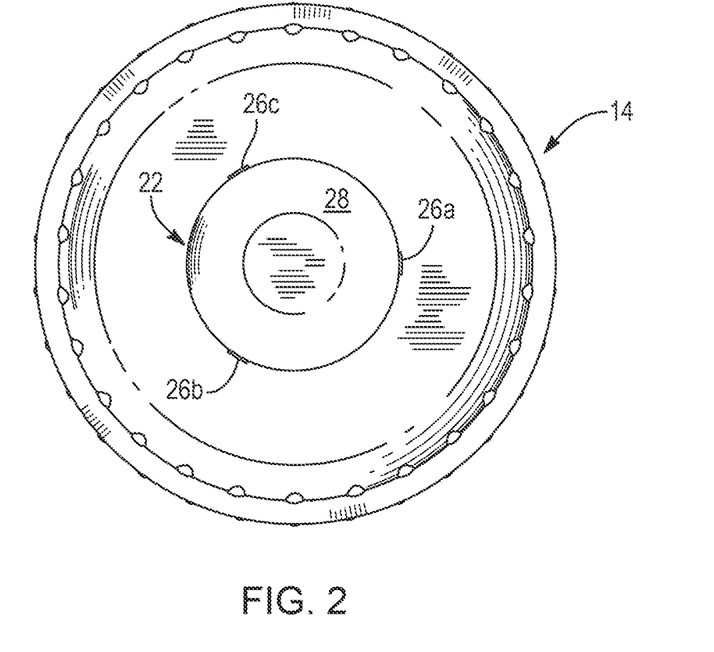
FIG. 2 is a top plan view of the water alarm of FIG. 1.
Figure 3:
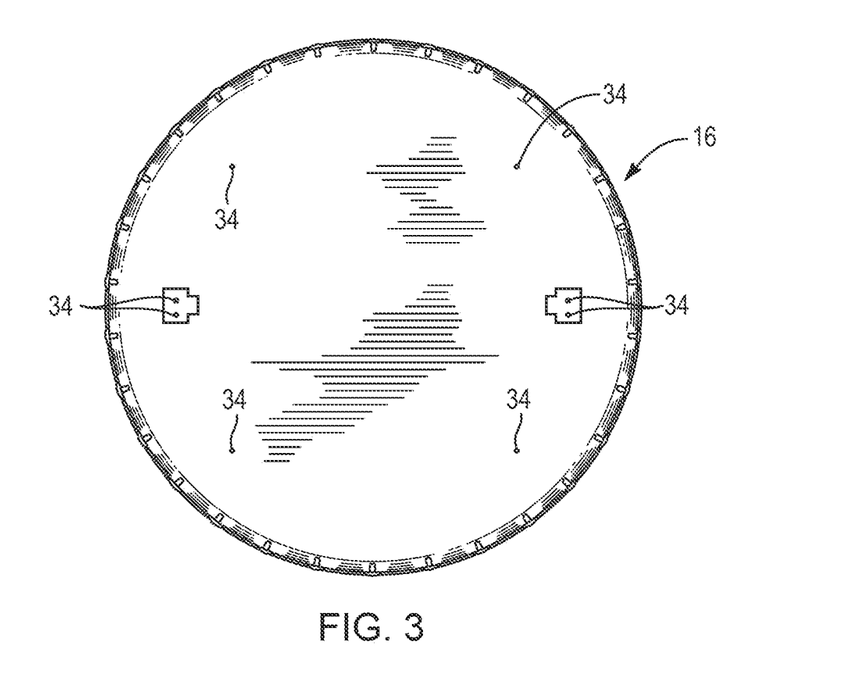
FIG. 3 is a bottom plan view of the water alarm of FIG. 1.
Figure 4:
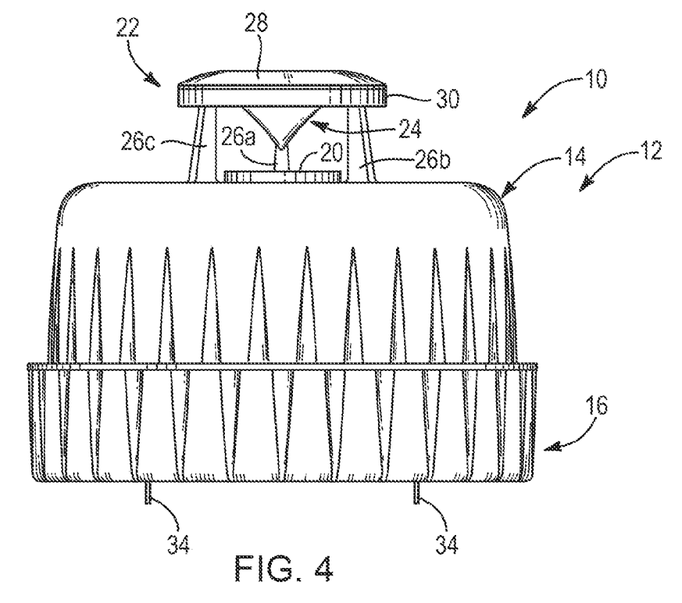
FIG. 4 is a front elevation view of the water alarm of FIG. 1.
Figure 5:
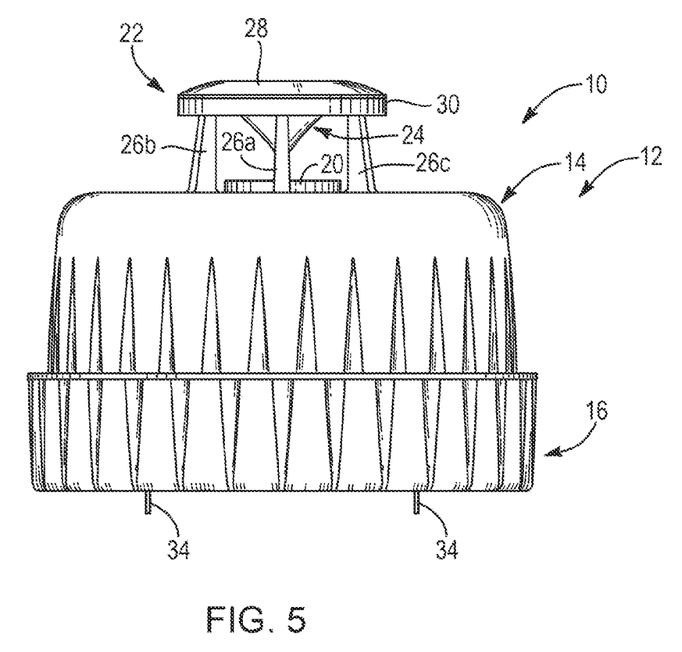
FIG. 5 is a rear elevation view of the water alarm of FIG. 1.
Figure 6:
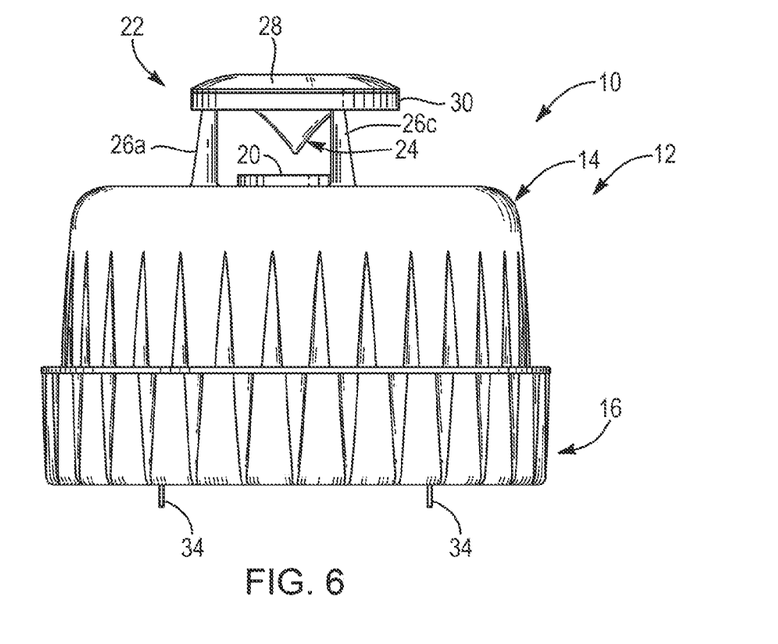
FIG. 6 is a first side view of the water alarm of FIG. 1.
Figure 7:
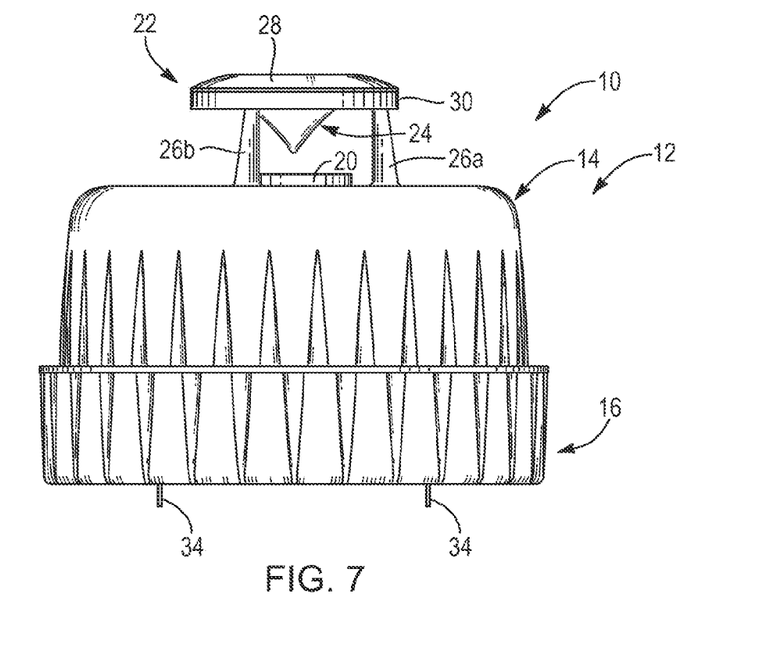
FIG. 7 is a second, opposite side view of the water alarm of FIG. 1.

In certain embodiments, a water alarm 10 may include a wave deflector 22. A wave deflector 22 may direct or distribute sound waves in a particular direction or pattern. For example, in selected embodiments, a sound generator may emit sounds waves primarily or preferentially in an axial (e.g., vertical) direction. Accordingly, if desired, a wave deflector 22 may reorient the sound waves to travel outward in a more radial distribution.

A wave deflector 22 may be positioned in any suitable position. In selected embodiments, a wave deflector 22 may be built into an outlet portion of a sound generator. Alternatively, or in addition thereto, a wave deflector 22 may be positioned outside a housing 12. For example, as shown in the illustrated embodiment, a wave deflector 22 may connect to a housing 12 directly over an aperture 18 occupied by an outlet portion 20 of a sound generator.

A wave deflector 22 may have any suitable configuration. The particular configuration of a wave deflector 22 may depend on the particular wave reorientation to be produced thereby. In selected embodiments, a wave deflector 22 may be configured to preferentially reorient sound waves to a particular direction. Alternatively, a wave deflector 22 may be configured to preferentially reorient sound waves to a particular region (e.g., a particular portion of the 360 degrees surrounding a water alarm 10). In still other embodiments, a wave deflector 22 may be configured to substantially uniformly distribute sound waves throughout a surrounding area (e.g., throughout the 360 degrees surrounding a water alarm 10).

A wave deflector 22 may comprise a deflection surface 24 shaped to produce the desired reorientation or redirection of the sound waves output by a sound generator. In selected embodiments, a deflection surface 24 may be angled or curved. In the illustrated embodiment, a portion of the deflection surface 24 resembles an inverted cone. Accordingly, a sound waves exit an outlet portion 20 of a sound generator in an axial direction, they may reoriented by the deflection surface 24 to travel radially away from the water alarm 10.

A wave deflector 22 may further include one or more supports 26. For example, as shown in the illustrated embodiment, a wave deflector 22 may be spaced from a housing 12 by a plurality of supports 26a, 26b, 26c. Such supports 26 may extend to position and support the rest of a wave deflector 22 in a desired location and orientation. A wave deflector 22 may also include a cap 28. In selected embodiments, a cap 28 may cover a backside of a structure 30 or wall 30 providing the deflection surface 24, thereby improving the aesthetic appeal of a water alarm 10.

A cap 28, structure 30, or some combination thereof may be secured together or to the rest of a wave deflector 22 in any suitable manner. In selected embodiments, a cap 28, structure 30, or the like may connect together or to the rest of a wave deflector 22 via a threaded engagement, bonding agent, weld, or other mechanical engagement. For example, in certain embodiments, one or more heat stakes may extend from one or more supports 26 through one or more corresponding apertures in a structure 30. Melting, flattening, or otherwise deforming the heat stakes may secure (e.g., "rivet") the structure to the supports 26. A cap 28 may then be bonded to the structure 30.

A wave deflector 22 may be formed of any suitable material or combination of materials. Similarly, a wave deflector 22 may be formed using any suitable method. In selected embodiments, one or more components 24, 26, 28 of a wave deflector 22 may be formed of a polymeric material in a molding process.

A wave deflector 22, or one or more of the components thereof, may be connected to a housing 12, sound generator, or the like in any suitable manner. Suitable connection mechanisms may include threaded engagements, bonding agents, welds, or the like. Alternatively, or in addition thereto, one or more of the components of a wave deflector 22 may be connected to a housing 12, sound generator, or the like via monolithic formation. For example, as shown in the illustrated embodiment, one or more supports 26 may be monolithically formed (e.g., molded) to extend from a top portion 14 of a housing 12.

In selected embodiments, one or more conductors 34 may extend from an interior of a housing 12 to an exterior of the housing 12. Certain components of a water alarm 10 may monitor electrical resistance between the one or more conductors 34. Such components may trigger an alarm (e.g., activate a sound generator, light generator, or the like) whenever certain changes in the electrical resistance between two or more conductors 34 is detected.

For example, water found in our environment is typically a fairly good conductor of electricity. Accordingly, the presence of water (e.g., standing water, a moist surface, or the like) may detectably lower the electrical resistance between two or more conductors 34. Thus, an alarm 10 in accordance with the present invention may detect the presence of water and alert one or more persons of the same.

In selected embodiments, an alarm 10 may activate an alarm generator whenever an electrical resistance between two or more conductors 34 drops below a particular level. For example, an alarm 10 may have a predetermined threshold built therewithin. Accordingly, whenever the electrical resistance between two or more conductors 34 drops below the threshold, the alarm may be activated. Alternatively, an alarm 10 may trigger whenever an electrical resistance between two or more conductors 34 changes (e.g., drops) a certain amount within a selected period of time. Thus, an alarm 10 may trigger based on changes or rates of change in resistivity and not on a certain hardcoded threshold.

Figure 8:
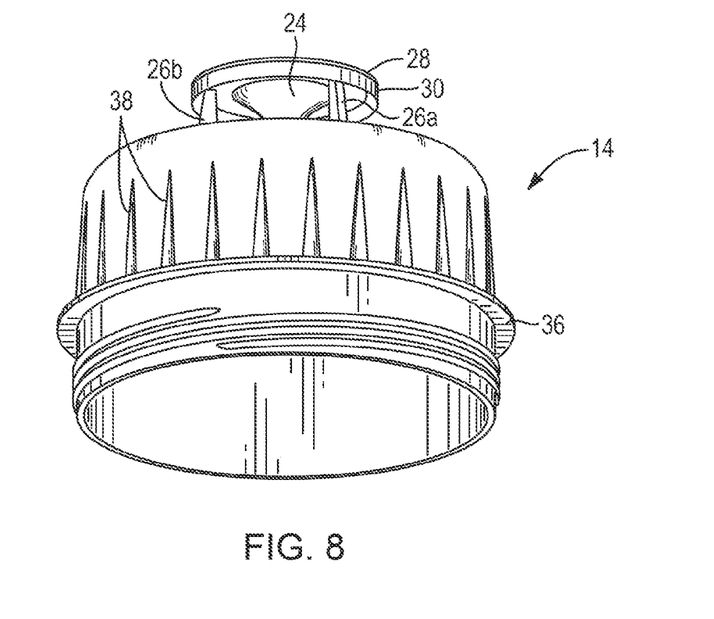
FIG. 8 is a perspective view of the wave deflector and top portion of the housing of FIG. 1.
Figure 9:
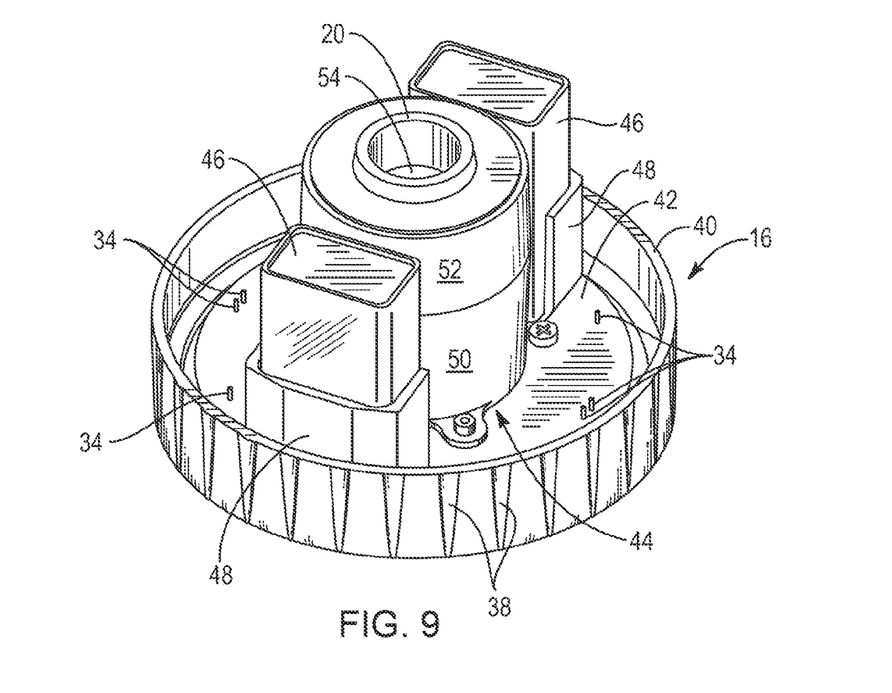
FIG. 9 is a perspective view of certain internal components positioned within the bottom portion of the housing of FIG. 1.

Referring to FIGS. 8 and 9, the various components of a housing 12 may connect in any suitable manner. In selected embodiments, top and bottom portions 14, 16 of a housing 12 may be generally cylindrical in shape and engage one another in a threaded engagement. For example, as shown in the illustrated embodiment, a section of the top portion 14 may thread within a corresponding section of the bottom portion 16.

If desired, various structures may be incorporated into a housing 12 to support or facilitate engagement between various components thereof. For example, as stated above, in selected embodiments, top and bottom portions 14, 16 of a housing 12 may engage one another in a threaded engagement. Accordingly, a housing 12 may include a stop 36 limiting how far one component may thread into or onto a corresponding component. A housing 12 may also include one or more grip enhancers 38 enabling a user to better grip and rotate various components with respect to one another.

In certain embodiments, a stop 36 may comprise a flange extending radially from a top portion 14 of a housing 12. When a housing 12 is assembled, such a stop 36 may abut a top edge 40 of a bottom portion 16. Grip enhancers 38 may have any suitable configuration. In selected embodiments, grip enhancers 38 may enable a user to better grip a top or bottom portion 14, 16. However, the particular shape, arrangement, or look of a grip enhancer 38 or an arrangement of grip enhancers 38 may be primarily ornamental.

A housing 12 in accordance with the present invention may contain and protect various components of an alarm 10. The nature and configuration of such components may vary between embodiments. In selected embodiments, the internal components of an alarm 10 may include a circuit board 42 (e.g., a printed circuit board (PCB)), a sound generator 44, one or more batteries 46, one or more mounts (e.g., battery mounts 48) for securing various components in place, and the like or combinations or sub-combinations thereof.

A sound generator 44 in accordance with the present invention may have any suitable configuration. In selected embodiments, a sound generator 44 may include a base 50, a sound head 52, an oscillator 54, and the like or combinations or sub-combinations thereof. A base 50 may properly position a sound head 52 and corresponding outlet portion 20 with respect to a housing 12. In certain embodiments, a base 50 may create or define a cavity therewithin. The cavity may assist in producing a desired sound output. A sound head 52 may comprise an outlet portion 20 and provide an interface between an oscillator 54 and the rest of a sound generator 44 (e.g., a base 50) or one or more surrounding components. An oscillator 54 may produce, in response to one or more electrical inputs, oscillations of a desired frequency and amplitude. Such oscillations may produce sound waves for alerting one or more human beings nearby.

Figure 10:
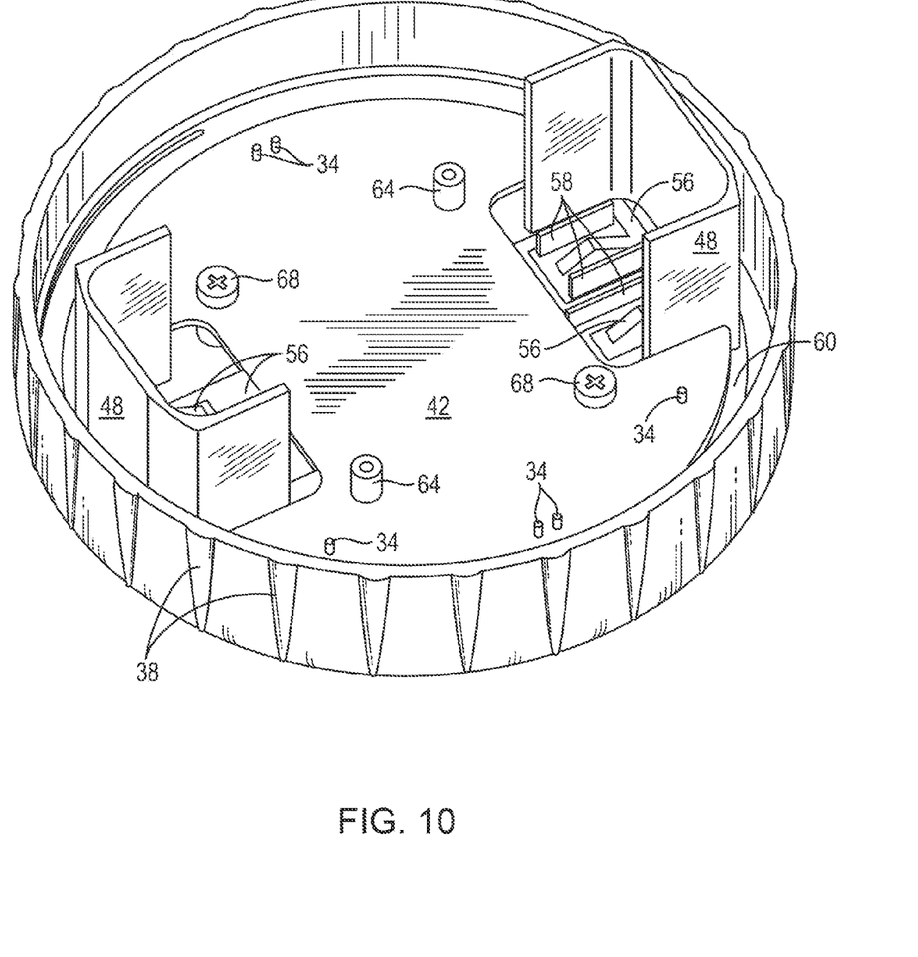
FIG. 10 is a perspective view of one embodiment of a circuit board positioned within the bottom portion of the housing of FIG. 1.

Referring to FIG. 10, a battery mount 48 in accordance with the present invention may have any suitable configuration. In selected embodiments, an alarm 10 may rely on power provided by one or more nine volt batteries. Accordingly, one or more battery mounts 48 may be configured to support such batteries. For example, in the illustrated embodiment, multiple terminals 56 are connect to a circuit board 42 and multiple batteries mounts 48 are positioned to support a corresponding nine volt battery in contact with such terminals 56.

In selected embodiments, one or more battery mounts 48 may include one or more blocking elements 58. Such blocking elements 58 may interact with one or more batteries 46 to ensure that the batteries 46 are installed correctly. For example, certain blocking elements 48 may prevent a user from improperly positioning a smaller positive terminal of a nine volt battery in contact with a negative terminal 56 of an alarm 10.

Battery mounts 48 may be formed of any suitable materials. In selected embodiments, battery mounts 48 may be formed of a polymeric material. Battery mounts 48 may be connected to a housing 12, circuit board 42, or the like in any suitable manner. In certain embodiments, battery mounts 48 may be monolithically formed with a bottom portion 16 of a housing 12 in a molding process.

Figure 11:
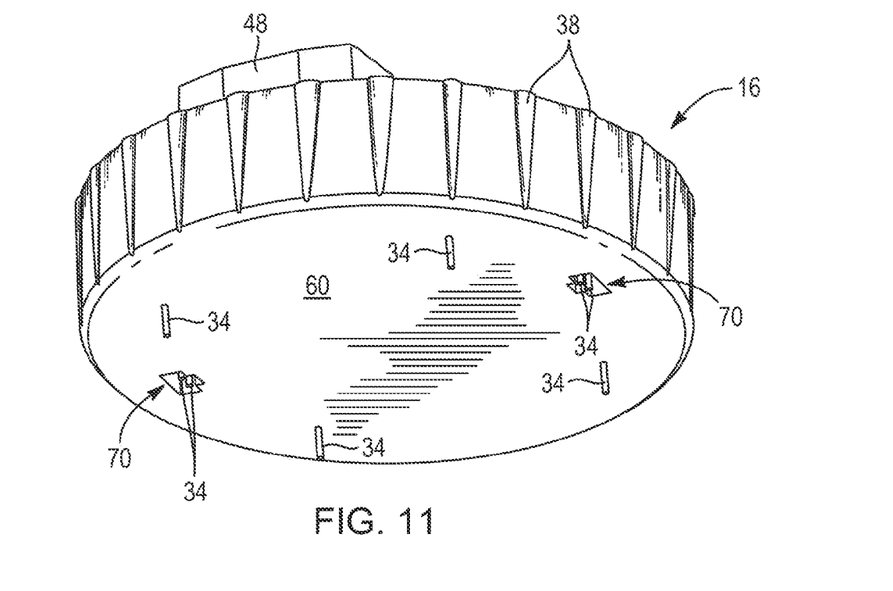
FIG. 11 is a first, external perspective view of the bottom portion of the housing of FIG. 1.
Figure 12:
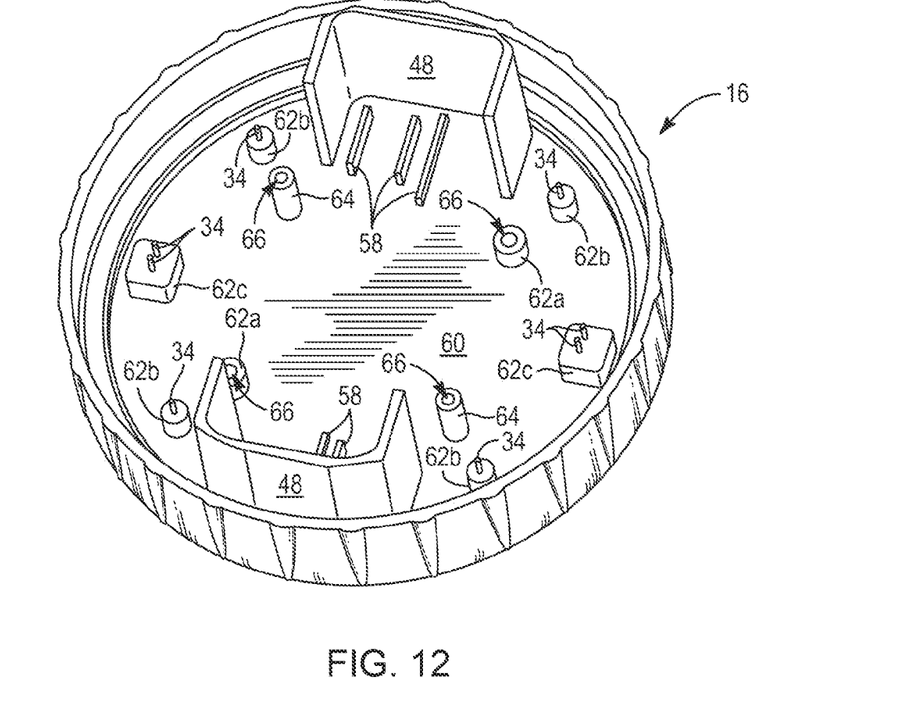
FIG. 12 is a second, internal perspective view of the bottom portion of the housing of FIG. 1.

Referring to FIGS. 10-12, a circuit board 42 may be positioned within a housing 12 in any suitable manner. In selected embodiments, one or more conductors 34 may extend through a bottom panel 60 of a bottom portion 16 of a housing 12. Accordingly, in such embodiments, a circuit board 42 may be positioned proximate the bottom panel 60 in order to readily access or contact the conductors 34. For example, as shown in the illustrated embodiment, a circuit board 42 may extend proximate and parallel to a bottom panel 60.

In selected embodiments, an alarm 10 may include various posts 62, 64 or extensions 62, 64. Certain posts 62 may extend between a bottom panel 60 and a circuit board 42 to define a spacing therebetween. Other posts 64 may extend (e.g., through a corresponding aperture in a circuit board 42) to provide a securement location for some other component of an alarm 10. For example, such posts 64 may provide a location for securing a sound generator 44.

Posts 62, 64 in accordance with the present invention may have any suitable configuration. In selected embodiments, posts 62, 64 may be formed on a material exhibiting dielectric properties. For example, posts 62, 64 may be formed of a polymeric material. In certain embodiments, posts 62, 64 may be formed as monolithic extensions of a bottom portion 16 in a molding process.

In selected embodiments, certain posts 62*a*, 64 may include an aperture 66 extending therewithin. Such an aperture 66 may facilitate swaging, bending, melting, or other deformation of a post 62*a*, 64 to engage or secure some other component. Alternatively, an aperture 66 may provide a location for a fastener 68 to engage the post 62*a*, 64. For example, as shown in the illustrated embodiment, a threaded fastener 68 may engage an aperture 66 with certain posts 62*a* to maintain a circuit board 44 properly secured within a bottom portion 16 of a housing 12.

In selected embodiments, certain posts 62*b*, 62*c* may house, contain, or secure one or more conductors 34 therewithin. For example, in certain embodiments, a bottom panel 60 may be relatively thin. Thus, it may have little surface area to contact or grip a conductor 34 extending therethrough. Accordingly, in selected embodiments, post 62*b*, 62*c* may increase the surface area in contact with a conductor 34 and provide a better engagement between a conductor 34 and a housing 12.

In certain embodiments, one or more posts 62*c* may be shaped and sized to support engagement with a remote or extension. That is, in selected situations, it may be desirable to extend the sensing abilities of an alarm 10 to regions spaced from a housing 12. For example, certain small spaces may be inaccessible to a housing 12. Accordingly, a user may obtain a remote to enable an alarm 10 to monitor conditions in such small spaces.

A remote may connect to an alarm 10 in any suitable manner. In selected embodiments, a remote may include a plug configured to engage one or more receptacles 70 formed in a housing 12 of an alarm 10. For example, as shown in the illustrated embodiment, a bottom panel 60 of a housing 12 may include one or more receptacles 70. Via each such receptacle 70, an alarm 10 may independently and simultaneously receive and support a corresponding remote.

In selected embodiments, certain posts 62*c* may cooperate with some portion of a housing 12 (e.g., a bottom panel 60) to define a cavity forming a receptacle 70. Accordingly, such posts 62*c* may have a size and shape corresponding to that of a plug of a remote. Additionally, such posts 62*c* may receive or secure various conductors 34. For example, the posts 62*c* may receive two conductors 34, which a remote may electrically extend out to a desired location or space. Thus, an alarm 10 may detect the presence of water in the area of a remote just as it does in the area of the alarm 10 itself.

Figure 13:
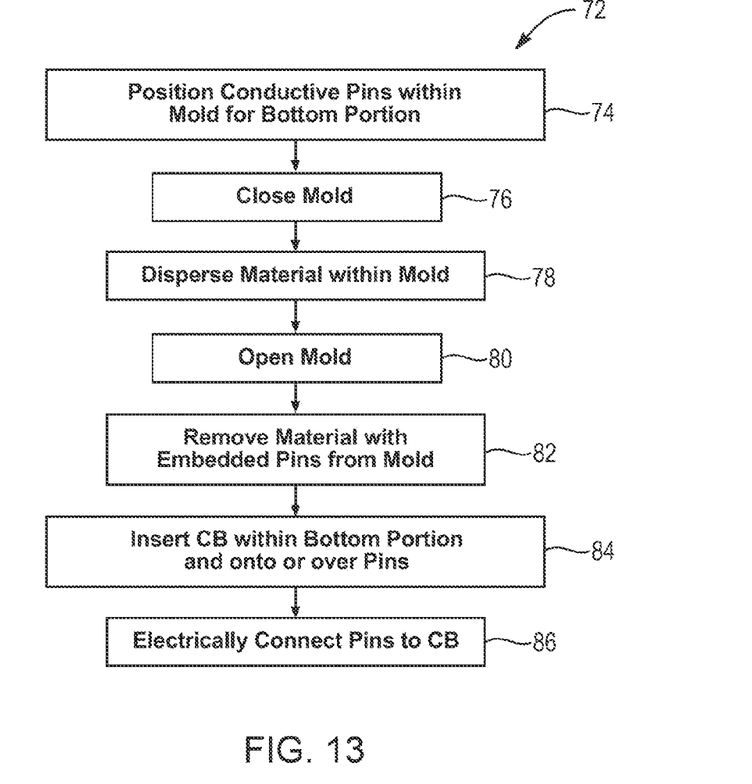
FIG. 13 is a schematic block diagram illustrating one embodiment of a manufacturing method in accordance with the present invention.
Figure 14:
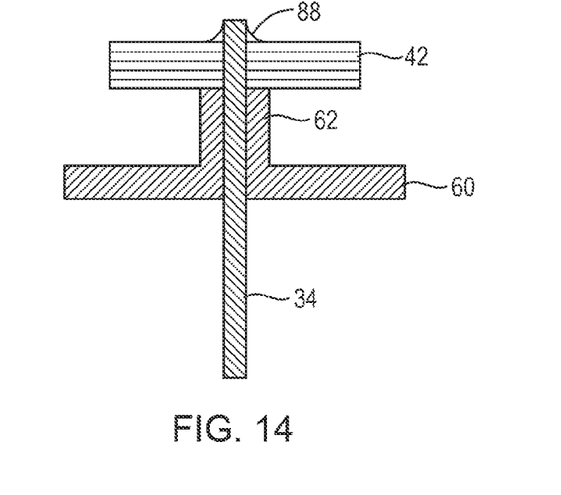
FIG. 14 is a partial, cross-sectional view of one embodiment of a conductor positioned within a post and extending from an internal circuit board to an exterior of a housing in accordance with the present invention.

Referring to FIGS. 13 and 14, conductors 34 in accordance with the present invention may be secured within a housing 12 in any suitable manner. In selected embodiments, one or more conductors 34 may simply extend with a slip fit through corresponding apertures in a wall (e.g., bottom panel 60) of a housing 12. Alternatively, one or more conductors 34 may engage a housing 12 in some manner. In certain embodiments, such an engagement may provide a seal. Alternatively, or addition thereto, such an engagement may resolve thrust forces urging relative motion between a conductor 34 and a housing 12.

An engagement between a conductor 34 and a housing 12 may be created in any suitable manner. In selected embodiments, an engagement may be created by urging a heated conductor 34 through a wall of a housing 12 or through an undersized aperture in a wall of a housing 12. The heated conductor 34 may melt a small portion of a housing 12 immediately adjacent thereto. Before cooling and solidifying, the molten material may form an intimate and tight connection between the conductor 34 and the housing 12.

In selected alternative embodiments, an engagement may be created by insert molding one or more conductors 34 within a housing 12. Such a manufacturing process 72 may begin with positioning 74 one or more conductors 34 within a mold for a housing 12 or some portion thereof (e.g., a mold for a bottom portion 16 of a housing 12). The mold may then close 76 and a material (e.g., thermoplastic polymer, thermoset polymer, or the like) may be dispersed 78 (e.g., injected, pressed) therewithin. Once the desired shape is substantially fixed, the mold may be opened 80 and the resulting component, with the conductors 34 embedded therewithin, may be removed 82 therefrom. Subsequently, in an assembly process a circuit board 44 may be positioned 84 onto or over the conductors 34 and the conductors 34 may be electrically connected 86 (e.g., soldered 88) to appropriate portions of the circuit board 44.

Conductors 34 in accordance with the present invention may have any suitable configuration. Regardless of the shape of a conductor 34, in an insert molding process, molten material may flow around the conductor 34 and form an intimate contact therewith. For example, as shown in the illustrated embodiment, conductors 34 may comprise cylindrical pins or dowels formed of a metal or metal alloy. Accordingly, in an insert molding process, molten material may flow around and engage the pins, sealing an interface therebetween against the intrusion of water or the like and holding the pins firmly in place. In selected embodiments, insert molding one or more conductors 34 within corresponding posts 62, the contact area between the conductors 34 and the housing 12 may be increased, thereby increasing the strength of the engagement formed.

Figure 15:
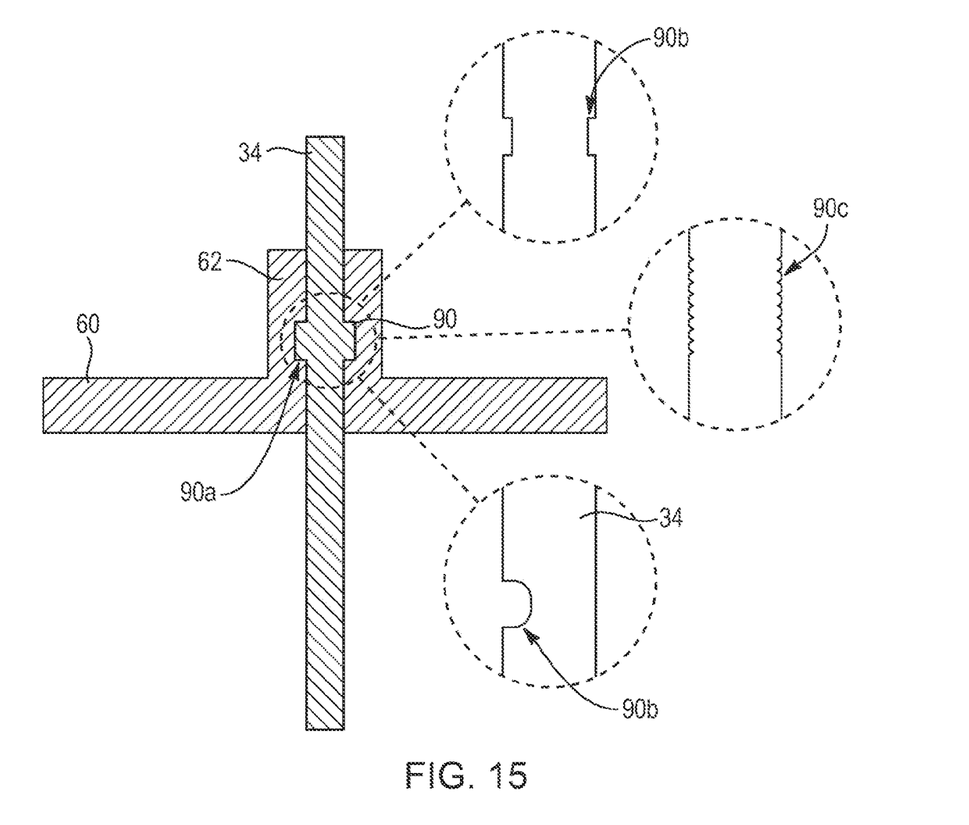
FIG. 15 is a partial, cross-sectional view of another embodiment of a conductor positioned within a post and extending from an interior of a housing to an exterior of the housing in accordance with the present invention.
Figure 16:
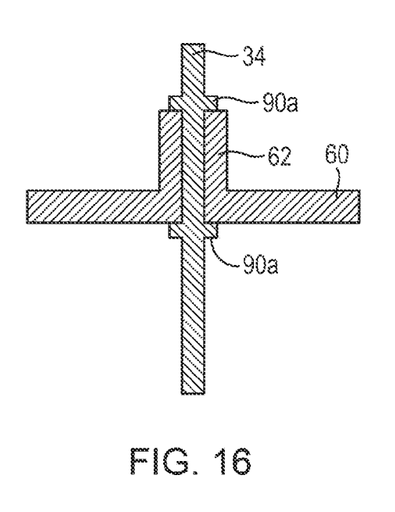
FIG. 16 is a partial, cross-sectional view of another embodiment of a conductor positioned within a post and extending from an interior of a housing to an exterior of the housing in accordance with the present invention.
Figure 17:
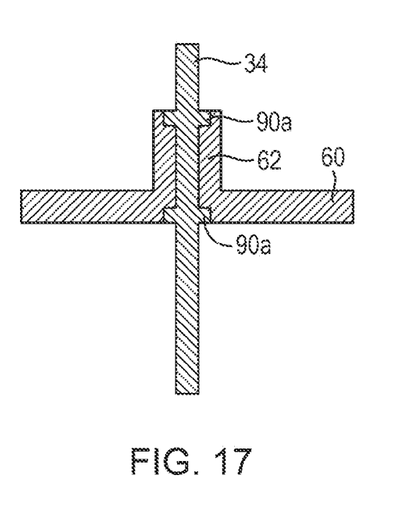
FIG. 17 is a partial, cross-sectional view of another embodiment of a conductor positioned within a post and extending from an interior of a housing to an exterior of the housing in accordance with the present invention.

Referring to FIGS. 15-17, in selected embodiments, a conductor 34 in accordance with the present invention may include a lock 90. A lock 90 may be configured to increase the strength of an engagement between a conductor 34 and surrounding material (e.g., the surrounding portion of a housing 12, post 62, or a combination thereof). A lock 90 may have any suitable configuration. In certain embodiments, a lock 90 may comprise one or more extensions 90*a*, one or more indentations 90*b*, or the like or some combination thereof formed as part of or connected to a conductor 34.

Such extensions 90*a* or indentations 90*b* may provide additional surfaces or edges that may be engaged by molten material in a manufacturing process and increase the ability of material, once hardened, to resist thrust forces urging relative motion between a conductor 34 and a housing 12. Accordingly, a lock 90 may assist in preserving a seal between a conductor 34 and a housing 12 and in preventing forces applied on an external portion of a conductor 34 from being passed through a wall of a housing 12 to be resolved internally (e.g., by a circuit board 42, or the like).

In selected embodiments, a lock 90 may comprise a monolithic extension 90*a*. For example, a lock 90 may comprise a shoulder 90*a* extending circumferentially around a conductor 34. Alternatively, or in addition thereto, a lock 90 may comprise an indentation 90*b*. For example, a lock 90 may comprise a groove 90*b* extending circumferentially around a conductor 34. In other embodiments, a lock 90 may comprise a notch 90*b* pressed or ground into a conductor 34. In still other embodiments, a lock 90 may comprise a roughened surface 90*c*. Such a surface 90*c* may comprise one or more extension 90*a*, indentations 90*b*, or the like formed on a much small (e.g., micro) scale. For example, a roughened surface 90*c* may comprise knurling, a sand or bead blasted surface, an abraded surface, or the like or some combination or sub-combination thereof.

In certain embodiments, a lock 90 may be positioned within the thickness of a wall (e.g., bottom panel 60) of a housing 12. Alternatively, or in addition thereto, a lock 90 may be positioned within the height of a post 62. For example, in selected embodiments, one lock 90*a* may be positioned within a post 62, while another lock 90*a* may be positioned within a wall of a housing 12. In still other embodiments, one or more locks 90 may be positioned outside of both of the wall and post 62. For example, one or more extensions 90*a* may abut or bracket a wall, post 62, or both to resolve thrust loads imposed on a conductor 34.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A water alarm comprising:
   a housing defining an interior and an exterior and comprising a bottom portion and a top portion;
   a circuit board contained within the interior of the housing;
   a power source electrically connected to deliver electrical power to the circuit board;
   a sound generator electrically connected to the circuit board;
   a plurality of conductors electrically connected to the circuit board, each conductor of the plurality of conductors being electrically conductive and extending through the bottom portion from the interior to the exterior;
   the plurality of conductors, wherein each conductor thereof has an overall length extending in an axial direction from a first end contained within the housing to a second end located outside the housing; and
   the plurality of conductors, wherein each conductor thereof comprises at least one extension or indentation extending in a radial direction, the at least one extension or indentation directly engaging material forming the bottom portion and resisting relative movement in the axial direction between the conductor and the bottom portion.

2. A method for assembling a water alarm, the method comprising:
   obtaining a plurality of conductors, each being electrically conductive and having a length extending in an axial direction and at least one indentation or extension extending in a radial direction;
   insert molding the plurality of conductors within a bottom portion of a housing such that each of the plurality of conductors extends through the bottom portion from an interior of the bottom portion to an exterior of the bottom portion;
   sealing, by molten material of the bottom portion during the insert molding, a plurality of interfaces against an incursion of water therethrough, wherein each interface of the plurality of interfaces extends from the interior to the exterior between the bottom portion and a different conductor of the plurality of conductors;
   engaging, by the molten material during the insert molding, the at least one indentation or extension of each conductor of the plurality of conductors;
   inserting, after the insert molding, a circuit board into the interior of the bottom portion;
   electrically connecting, after the insert molding, each conductor of the plurality of conductors to the circuit board; and
   securing a top portion of the housing to the bottom portion.

3. The method of claim 2, further comprising electrically connecting a sound generator to the circuit board.

4. The method of claim 2, wherein the securing comprises threading one of the top portion and bottom portion into the other.

5. The method of claim 2, wherein the electrically connecting each conductor to the circuit board comprises soldering.

6. The method of claim 2, further comprising electrically connecting a power source to the circuit board.

7. A method for assembling a water alarm, the method comprising:
   obtaining a plurality of conductors, each conductor being electrically conductive and having a length extending in an axial direction and at least one indentation or extension extending in a radial direction;
   insert molding the plurality of conductors within a bottom portion of a housing such that each of the plurality of conductors extends through the bottom portion from an interior of the bottom portion to an exterior of the bottom portion;
   engaging, by a material forming the bottom portion during the insert molding, the at least one indentation or extension of each conductor of the plurality of conductors to resist relative motion between each conductor and the bottom portion;
   inserting, after the insert molding, a circuit board into the interior of the bottom portion;
   electrically connecting, after the insert molding, each conductor of the plurality of conductors to the circuit board; and
   securing a top portion of the housing to the bottom portion.

8. The method of claim 7, further comprising electrically connecting a sound generator to the circuit board.

9. The method of claim 8, wherein the securing comprises threading one of the top portion and bottom portion into the other.

10. The method of claim 9, wherein the electrically connecting each conductor to the circuit board comprises soldering.

* * * * *